US012779757B2

(12) United States Patent
Klammer et al.

(10) Patent No.: US 12,779,757 B2
(45) Date of Patent: Nov. 3, 2026

(54) FILTER DEVICE

(71) Applicant: ENGEL AUSTRIA GmbH, Schwertberg (AT)

(72) Inventors: Guenther Klammer, Aschbach Markt (AT); Thomas Koepplmayr, Marchtrenk (AT); Gerhard Baeck, Schwertberg (AT); Raffael Johannes Rathner, Scharnstein (AT); Klaus Fellner, Steyr (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 142 days.

(21) Appl. No.: 18/214,889

(22) Filed: Jun. 27, 2023

(65) Prior Publication Data

US 2024/0083087 A1 Mar. 14, 2024

(30) Foreign Application Priority Data

Jul. 11, 2022 (AT) .............................. A 50507/2022

(51) Int. Cl.

| | |
|---|---|
| ***B29C 45/23*** | (2006.01) |
| ***B29C 45/17*** | (2006.01) |
| ***B29C 45/58*** | (2006.01) |
| ***B29C 48/69*** | (2019.01) |
| *B29C 37/00* | (2006.01) |

(52) U.S. Cl.

CPC .......... *B29C 48/69* (2019.02); *B29C 45/1775* (2013.01); *B29C 45/23* (2013.01); *B29C 45/58* (2013.01); *B29C 2037/96* (2013.01)

(58) Field of Classification Search

CPC . B29C 48/2545; B29C 2037/96; B29C 45/24; B29C 48/69; B29C 45/1775

See application file for complete search history.

(56) References Cited

U.S. PATENT DOCUMENTS

| | | | | |
|---|---|---|---|---|
| 5,246,660 | A * | 9/1993 | Tsutsumi ................ | B29C 45/52 366/82 |
| 7,357,172 | B2 | 4/2008 | Teng et al. | |
| 10,828,815 | B2 | 11/2020 | Halter et al. | |
| 2005/0284601 | A1 | 12/2005 | Teng et al. | |

(Continued)

FOREIGN PATENT DOCUMENTS

| | | |
|---|---|---|
| CN | 1060621 | 4/1992 |
| CN | 209566477 | 11/2019 |

(Continued)

*Primary Examiner* — Alison L Hindenlang
*Assistant Examiner* — Debjani Roy
(74) *Attorney, Agent, or Firm* — Wenderoth, Lind & Ponack, L.L.P.

(57) ABSTRACT

Filter device for a molding machine with at least one filter element for filtering plasticized material, in particular plasticized plastic, wherein, in a fluidically parallel arrangement relative to the at least one filter element, at least one valve element is provided, which is formed to prevent the plasticized material from flowing through the at least one valve element during an injection process in a closed position and to allow the plasticized material to flow through the at least one valve element in an open position, in order to make it possible to relieve the pressure on the at least one filter element after the injection process.

21 Claims, 9 Drawing Sheets

(56) References Cited

U.S. PATENT DOCUMENTS

| | | | | |
|---|---|---|---|---|
| 2008/0210720 | A1* | 9/2008 | Teng | B22D 17/203 277/354 |
| 2010/0034917 | A1* | 2/2010 | Schulz | B29C 48/55 425/377 |
| 2012/0111426 | A1* | 5/2012 | Trakas | B29C 48/2554 137/511 |
| 2017/0368730 | A1* | 12/2017 | Halter | B29C 48/694 |

FOREIGN PATENT DOCUMENTS

| | | |
|---|---|---|
| DE | 8232097 | 11/1985 |
| DE | 41 33 646 | 4/1993 |
| DE | 10 2007 045 439 | 10/2008 |
| DE | 10 2015 224 411 | 6/2017 |
| EP | 735267 | * 10/1996 |
| JP | 2001-198961 | 7/2001 |
| WO | 2016/095022 | 6/2016 |

* cited by examiner 22
21
1,20
3

1,20
21
3

22
21
1,20
3
23

FILTER DEVICE

BACKGROUND OF THE INVENTION

The present invention relates to a filter device, a plasticizing unit, as well as a molding machine with such a plasticizing unit and/or filter device.

By molding machines may be meant injection-molding machines, transfer-molding machines, presses and the like. Molding machines in which the plasticized material is supplied to an open mold are also entirely conceivable.

The state of the art is to be outlined below with reference to an injection-molding machine. This applies analogously to molding machines in general.

Plasticizing units for injection-molding machines known in the state of the art comprise a plasticizing screw for plasticizing and injecting a plasticizable material into a mold cavity of a mold, wherein the plasticizing screw is arranged movable in a rotating manner and axially with respect to a screw axis.

Embodiment variants in which, via a plasticizing screw, a plasticizing of the material to be plasticized is effected, which is then injected via a separate injection unit—for example an injection plunger—are also well known.

It is known to process contaminated plastics as material to be plasticized. These plastics can be for example granules, material to be ground or agglomerates (post-consumer as well as post-industrial), which are processed to form a new product in the course of a recycling or compounding application.

This topic is becoming ever more important, wherein through the recycling of plasticizable materials (for example thermoplastics) they can be supplied for a new use or a new area of application and thus a marked advantage can be created with respect to environmental friendliness.

However, in order to be able to use such materials again in an injection-molding process, it is first of all necessary to purify them, wherein the contaminants are to be removed from the material to be plasticized.

For this purification or prepurification of the materials to be plasticized, it is known, in a first step, to plasticize them using a continuously operating plasticizing unit and then to purify them using degassing processes and filter systems.

After filtration and degassing, the plasticized material is cooled again and solidifies, wherein the purified material is usually brought directly into a form that is easy to process further, such as for example granules, wherein the granules can be supplied directly to an injection-molding machine in a subsequent injection-molding process.

However, it has proved to be disadvantageous here that a relatively high expenditure of energy and effort is necessary for the purification of these materials for the preparation for an injection-molding process.

It would therefore be desirable to filter contaminated, plasticized materials using filter devices directly after the plasticizing by the injection-molding machine and then to supply the filtered, plasticized material directly to a mold cavity or a mold.

This yields an advantage to the effect that the contaminated material to be plasticized need not be plasticized several times, but rather can be processed in the course of one process.

However, a disadvantage here is that contaminated materials for the injection-molding process usually have a high contaminant content, as a result of which corresponding filter devices have to be cleaned or changed correspondingly often.

However, as these filter devices represent central points of the injection-molding machine or the plasticizing unit, because the diversion must not be too large, so that there is no danger of the plasticized material beginning to solidify again because of long flow paths, such processes for cleaning or changing the filter device are very laborious and associated with a great deal of assembly and/or disassembly work.

Consequently, long downtimes and/or production breaks for the cleaning of the filter devices and/or plasticizing units result, which has a disadvantageous effect on the productivity of the injection-molding machine.

SUMMARY OF THE INVENTION

The object of the present invention is therefore to provide a filter device, a plasticizing unit and a molding machine with such a plasticizing unit and/or filter device, in which the above-described disadvantages of the state of the art can be at least in part improved and/or smaller production losses during a filter cleaning or a filter change can be realized and/or a productivity can be increased and/or an energy efficiency can be increased.

As part of a first aspect of the invention, this object is achieved by a filter device as described below, as well as a plasticizing unit with such a filter device and a molding machine with such a plasticizing unit and/or such a filter device.

According to the first aspect of the invention it is provided that a filter device for a molding machine has at least one filter element for filtering plasticized material, in particular plasticized plastic, and that, in a fluidically parallel arrangement relative to the at least one filter element, at least one valve element is provided, which is formed

- to prevent the plasticized material from flowing through the at least one filter element during an injection process in a closed position and
- to allow the plasticized material to flow through the at least one valve element in an open position, in order to make it possible to relieve the pressure on the at least one filter element after the injection process.

Through a corresponding device with a valve element arranged parallel to the at least one filter element, a rapid and safe pressure relief of the filter element can be carried out.

A corresponding pressure relief of the at least one filter element is imperative before every cleaning and/or the filter change of the at least one filter element.

Through the provision of the parallel arrangement of a corresponding valve element relative to the filter element, this pressure relief can be carried out rapidly and in an uncomplicated manner (where appropriate even in an automated manner), whereby the preparation times for the filter cleaning and/or the filter change are significantly reduced.

A quicker and more efficient cleaning or change of the filter device is thus allowed by a filter device according to the invention according to the first aspect of the invention, whereby the use of contaminated materials in the injection-molding process is made much easier and more attractive to users.

Due to the more attractive design of the compounding and/or recycling application of contaminated materials in the injection-molding process, the number of correspondingly operated molding machines can also be increased, which has a positive effect on the environmental aspect.

Moreover, due to the reduced time required during a cleaning and/or a change of the filter device the downtime of the molding machine can be reduced, whereby in turn the productivity can be increased and the energy efficiency can be improved.

A device according to the invention according to the first aspect of the invention can also be used in already known embodiment variants of the state of the art, as described for example in the introduction to the description, and can be subsequently installed.

Within the meaning of the present document, by a filtration and/or a filtering of a plasticized material may be meant that foreign substances present in the plasticized material are, preferably mechanically, released, removed, discharged and/or separated at least partially from the plasticized material. This can thus also include separation methods.

By molding machines may be meant injection-molding machines, transfer-molding machines, presses and the like. Molding machines in which the plasticized material is supplied to an open mold are also entirely conceivable.

It can be provided that the at least one valve element is formed as a check valve, preferably as a nonreturn valve.

Alternatively or additionally, it can be provided that the at least one valve element is formed as a check valve, two-way valve, three-way valve and/or deflector.

It is preferably provided that the at least one filter element is arranged centrally in the flow direction of the plasticized material.

It can be provided that the at least one filter element at least partially, preferably completely, surrounds the at least one valve element preferably in a plane transverse to a flow direction of the plasticized material.

Protection is furthermore sought—as part of the first aspect of the invention—for a plasticizing unit for a molding machine with a filter device, wherein the filter device has at least one filter element for filtering plasticized material, in particular plasticized plastic, wherein, in a fluidically parallel arrangement relative to the at least one filter element, at least one valve element is provided, which is formed

- to prevent the plasticized material from flowing through the at least one valve element during an injection process in a closed position, and
- to allow the plasticized material to flow through the at least one valve element in an open position, in order to make it possible to relieve the pressure on the at least one filter element after the injection process.

It is preferably provided that the plasticizing unit has an injection cylinder and a plasticizing screw rotationally and linearly movable in the injection cylinder.

It can be provided that the filter device is downstream of the plasticizing screw and is formed to filter a material plasticized by the plasticizing screw.

It can preferably be provided that the at least one filter element is arranged in the injection cylinder and/or represents a part of the injection cylinder.

As part of a second aspect of the invention, the object is achieved by a plasticizing unit for a molding machine as described below, as well as with a molding machine with such a plasticizing unit.

As part of a second aspect of the invention it is provided that the plasticizing unit has an injection cylinder, wherein the injection cylinder has a front, nozzle-side structural component and a rear structural component and that a filter device, in particular a filter device according to the first aspect of the invention, for filtering plasticized material, in particular plasticized plastic, is arranged, preferably clamped, between the front structural component and the rear structural component.

Through the division of the injection cylinder according to the second aspect of the invention into at least two parts, into a front, nozzle-side structural component and a rear structural component, the possibility is created for clamping a filter or a filter device between the two structural components of the injection cylinder, whereby a material present in the injection cylinder can be filtered by the filter device in an effective manner.

If the filter device now has too great a coating, contamination or damage, the front structural component and the rear structural component of the injection cylinder can be detached from each other in order to release the filter device, whereby the filter device can be cleaned and/or changed in a simple, quick manner.

Simplifying and speeding up the cleaning and/or changing of the filter device can significantly reduce a downtime of the molding machine, whereby a productivity can be increased and an energy efficiency can be improved.

Through the increased productivity and/or the reduced downtime, the use of contaminated materials, such as are used in the compounding and/or recycling application, can again be made more attractive to a user, whereby an environmental aspect can be enhanced through the increased number of recycling and/or compounding applications.

Furthermore, through the reduced downtime an energy efficiency of the plasticizing unit and/or the molding machine is also increased with regard to the parts produced.

By molding machines may be meant injection-molding machines, transfer-molding machines, presses and the like. Molding machines in which the plasticized material is supplied to an open mold are also entirely conceivable.

A device according to the invention according to the second aspect of the invention can be used in already known embodiment variants of the state of the art, as described for example in the introduction to the description, and can be subsequently installed.

It can preferably be provided that an axially and rotationally movable plasticizing screw is arranged in the injection cylinder.

It can be provided that the front structural component and the rear structural component are braced by means of at least one tension means, preferably tension bolt, which is arranged alongside the injection cylinder and transverse to the connection point between nozzle-side front structural component and rear structural component.

Through the provision of at least one tension means, the front structural component can be braced with the rear one in a simple manner, wherein the filter device can be likewise braced between the front and the rear structural component via the bracing of the front structural component with the rear one with the aid of the at least one tension means.

The at least one tension means can have for example a screw connection, a tension bolt, a tension rod, an expansion screw and/or other tension elements known from the state of the art.

It is preferably provided that at least one expansion element is provided, which at least one expansion element is formed to establish and/or increase a spacing between the front structural component and the rear structural component, wherein at least one tension means is extended under deformation, preferably under at least partially elastic deformation, particularly preferably under fully elastic deformation.

Through the at least one expansion element, the pretensioning of the nozzle-side structural component (front structural component) with the rear structural component with the filter device can thus be dissipated under deformation of the tension means and the filter device can be released for a change and/or a cleaning.

Thus, a particularly quick and simple way of releasing the filter device for a cleaning and/or a change can be implemented by at least one expansion element without having to detach the at least one tension means.

It can be provided that the at least one expansion element has a, preferably hydraulic and/or pneumatic, drive unit.

It can preferably be provided that the at least one expansion element has at least one pressure and/or tension rod, which is formed to establish and/or increase the spacing between the front structural component and the rear structural component by exerting a pressure and/or tension on the front structural component and/or the rear structural component.

It is preferably provided that the front structural component and/or the rear structural component has a connection element, preferably a flange point, particularly preferably a clamping flange.

It can be provided that the front structural component and the rear structural component are connected by means of at least one clamping ring, preferably a flange clamping ring.

It is preferably provided that the filter device is arranged in a, preferably pipe-shaped, filter component of the injection cylinder, which filter component represents a component of the injection cylinder that is separate from the front structural component and the rear structural component and together with the front structural component and the rear structural component forms the injection cylinder.

Here, during a filter change the filter component can, in a simple manner, be detached from the front structural component and the rear structural component and replaced with a further filter component with uncontaminated filter device.

Through such a procedure, the time taken for changing and/or cleaning the filter device can be reduced to a minimum.

It can be provided that a separate clamping component—preferably the filter component—is provided, the front structural component is braced with the separate clamping component and the separate structural component is braced with the rear structural component.

It can preferably be provided that the bracing of the front structural component with the rear structural component and/or the filter component and/or the separate clamping component has at least one flange clamping ring and/or a partially radial force component.

It can preferably be provided that the filter device has a filter change device, preferably wherein the filter change device is formed as a cassette filter.

A cassette filter can have two or more filter elements, wherein a first filter element is in an engaged position in a melt stream of the plasticized material, in order to perform a filtration of the plasticized material. In the meantime, a further filter element of the cassette filter is released and is not in contact with the plasticized material.

While the first filter element is in an engaged position, the further filter element of the cassette filter can be cleaned of contaminants or changed.

If the first filter element has a greater loading and/or contamination, via the cassette filter the further filter element can be brought into an engaged position via a filter change device, wherein a filtration of the plasticized material by the further filter element takes place and the first filter element is released for cleaning and/or changing.

It can be provided that the filter device is formed similarly to a cassette deck and has two or more receiving devices for filter elements, wherein a receiving device can selectively be brought into an engaged position with the plasticized material and/or a released filter element can be positioned out of or in the receiving device by a filter change device (preferably an actuator).

The filter change device can for example be formed as a plate screen changer, piston screen changer, cassette screen changer and/or belt filter.

If a belt filter is provided as filter change device, it can be provided that the belt filter is guided through the melt stream of the plasticized material continuously or at intervals, wherein blocked filter regions or contaminants of the at least one filter device can be moved out of the melt stream of the material to be plasticized by the filter change device, in order not to impair the ongoing process of the plasticizing unit.

The moving of the at least one filter device in and/or out can for example take place in an operating state of the plasticizing unit in which a melt stream of plasticized material is not actively being pushed out by the plasticizing screw, with the result that no active pressure due to a melt stream of the plasticized material acts on the filter device during the moving in and/or moving out by the filter change device.

It can be provided that the at least one actuator is provided for conveying the plasticized material against the flow direction of the melt stream, in order to bring about a relief of a pressure of the plasticized material applied to the at least one filter device.

A corresponding embodiment variant can create the possibility of influencing, utilizing the at least one actuator, pressure conditions prevailing on the at least one filter device (which act on the filter device through the plasticized material) such that a pressure relief of the at least one filter device—which can for example be utilized for a filter change—can be carried out. This is preferably possible without additionally sealing the filter device off from the melt stream of the plasticized material (for example using a check valve).

As an alternative to an actuator for the pressure relief, a valve element can also be provided according to the first aspect of the present invention.

Within the meaning of the present document, by a pressure relief may be meant relieving substantial pressures on the filter device. Thus, by a pressure relief may also be meant a relief of the filter device when an approximately equally high pressure is exerted on the filter device from both sides.

In other words, it is characteristic of the pressure relief that forces acting on the filter device—preferably due to the plasticized material (above all in the flow direction of the melt stream)—can be reduced at least far enough to reduce the stress on the filter device to a sufficient extent that the filter device can be changed (and preferably no damage occurs to the filter device and/or the plasticizing unit when the filter device is being changed).

It is preferably provided that the at least one actuator for the pressure relief is formed by the plasticizing screw and/or by a plunger-cylinder unit, preferably in the form of a melt accumulator.

It can be provided that the plunger-cylinder unit is arranged between the filter device and the plasticizing screw in terms of flow or is arranged after the filter device in terms of flow.

In embodiments in which the plasticizing screw undertakes a role as actuator for the pressure relief, a pressure relief and/or backflushing of the filter device can be performed as an axial movement of the plasticizing screw against the flow direction of the plasticized material.

Of course, the different aspects of the invention can also be used in combination with each other.

BRIEF DESCRIPTION OF THE DRAWINGS

Further advantages and details of the invention are revealed by the figures and the associated description of the figures. There are shown in.

DETAILED DESCRIPTION OF THE INVENTION

Figure 1:
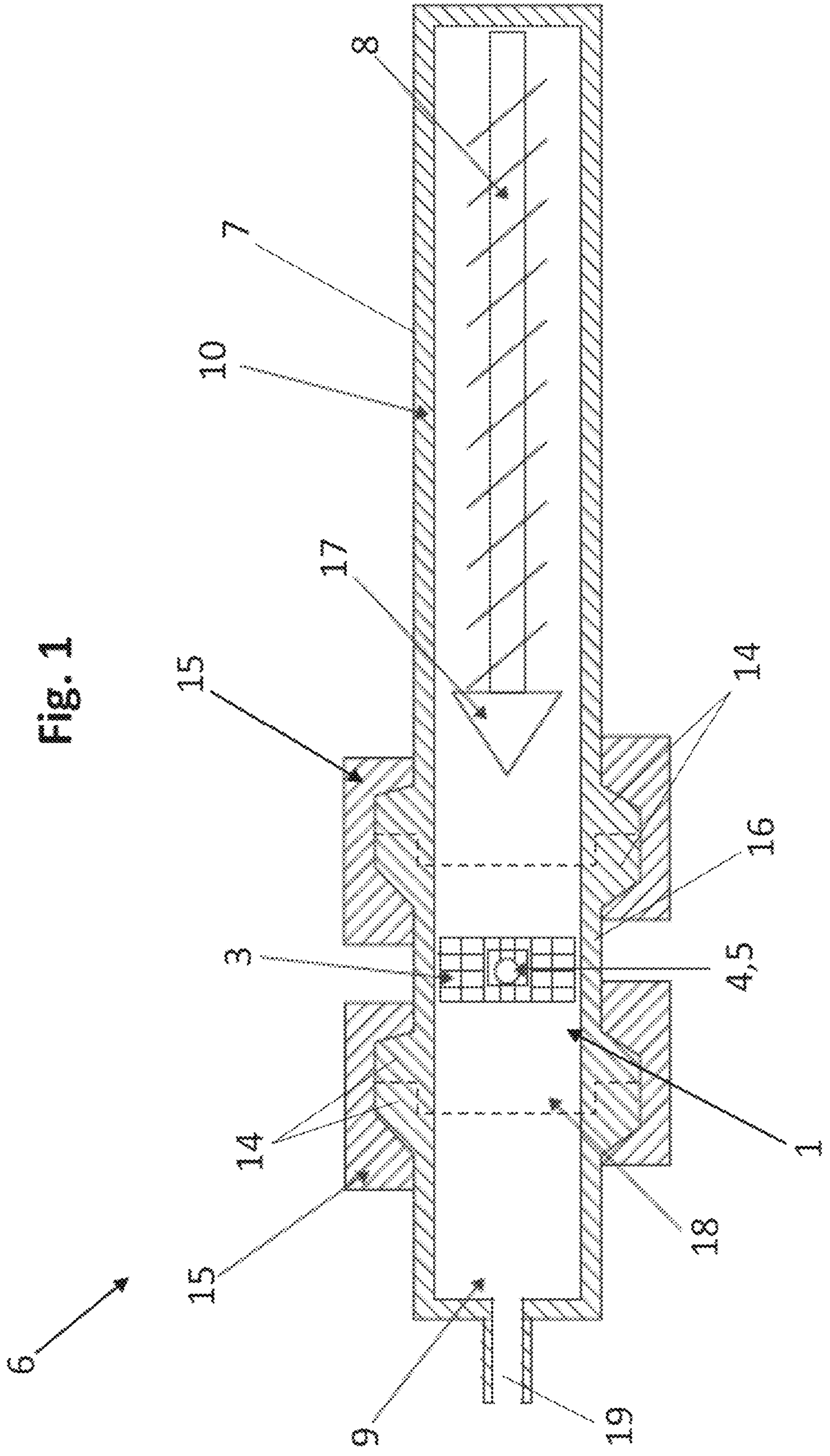
FIGS. 1+2 a first embodiment example of a plasticizing unit.

FIG. 1 shows a first embodiment example of a plasticizing unit 6 with an injection cylinder 7 and a plasticizing screw 8 arranged in the injection cylinder 7.

The injection cylinder 7 of this embodiment example is designed in three parts and has a nozzle-side front structural component 9, a rear structural component 10 and a filter component 16 arranged between front structural component 9 and rear structural component 10.

In this embodiment example, the front structural component 9 is connected to the filter component 16 via the clamping ring 15 and the filter component 16 is connected to the rear structural component 10 via the clamping ring 15.

The clamping rings 15 grip onto the connection elements 14 (in this embodiment example formed as flange points) of the front component 9, of the filter component 16 and of the rear component 10.

The front structural component 9 furthermore has an injection nozzle opening 19.

The filter device 1 is provided in the filter component 16.

The filter device 1 has a filter element 3 and a valve element 4 arranged in a fluidically parallel arrangement relative to the filter element 3.

In this embodiment example, the valve element 4 is formed by a nonreturn valve 5.

During the plasticizing of a material to be plasticized, it is plasticized via the plasticizing screw 8 of the plasticizing unit 6 via shearing, shear heat and optionally by externally introduced heat energy and conveyed in the direction of the injection nozzle opening 19.

After the plasticizing by the plasticizing screw 8, the plasticized material flows via the backflow barrier 17 in the direction of the injection nozzle opening 19 and in the process passes through the filter element 3, wherein the plasticized material is filtered by the filter element 3 and contaminants, particles and foreign substances dissolved in the plasticized material thus remain in the filter element 3.

After passing through the filter element 3, the plasticized material accumulates in the space in front of the screw 18, which is formed in the front structural component 9, before the plasticized material is pushed out of the injection cylinder 7 via the injection nozzle opening 19.

This pushing of the plasticized material out of the space in front of the screw 18 can be performed by the plasticizing screw 8 because the latter is arranged axially and linearly movable in the injection cylinder 7.

In this way, material plasticized by the plasticizing screw 8 through a rotational movement is conveyed into the space in front of the screw 18, until a desired quantity of plasticized material is present in the space in front of the screw 18.

While the plasticized material is accumulating in the space in front of the screw 18, this accumulating material pushes the plasticizing screw 8 back in the direction of the rear structural component 10.

If the desired quantity of plasticized material is now present in the space in front of the screw 18 (as a result of which a melt cushion is formed), the plasticizing screw 8 is moved axially in the direction of the injection nozzle opening 19, whereby the backflow barrier 17 closes and a pressure can be exerted on the plasticized material present in the space in front of the screw 18.

If the injection nozzle opening 19 is now (actively or passively) opened, the plasticized material present in the space in front of the screw 18 is pushed out of the injection cylinder 7 via the injection nozzle opening 19 by the pressure exerted on the plasticized material and the axial movement of the plasticizing screw 8, which represents the injection process.

This plasticized material pushed out via the nozzle opening 19 can for example be supplied to a mold 25 of a molding machine 2.

In this embodiment example, the valve element 4 is arranged centrally in the injection cylinder 7 surrounded by the filter element 3, wherein particularly favorable flow properties through the valve element 4 form.

Seen in a plane transverse to the flow direction of the plasticized material, the valve element 4 is completely surrounded by the filter element 3.

The valve element 4—more precisely: the nonreturn valve 5 of this embodiment example—is formed

- to prevent the plasticized material from flowing through the valve element 4 during the injection process in a closed position and
- to allow the plasticized material to flow through the valve element 4 in an open position, in order to make it possible to relieve the pressure on the filter element 3 after the injection process.

This has the marked advantage that after an injection process a pressure relief of the filter element 3 is always performed, which has an advantage to the effect that the pressure on the filter element 3 is relieved after the injection process in order to be able to carry out a cleaning and/or a change of the filter element 3.

Consequently, the pressure on the filter element 3 can be relieved quickly in every cycle of the plasticizing unit 6 in order for it to be cleaned and/or changed, which would require some time and expense if a filter element 3 without valve element 4 is provided.

Figure 2:
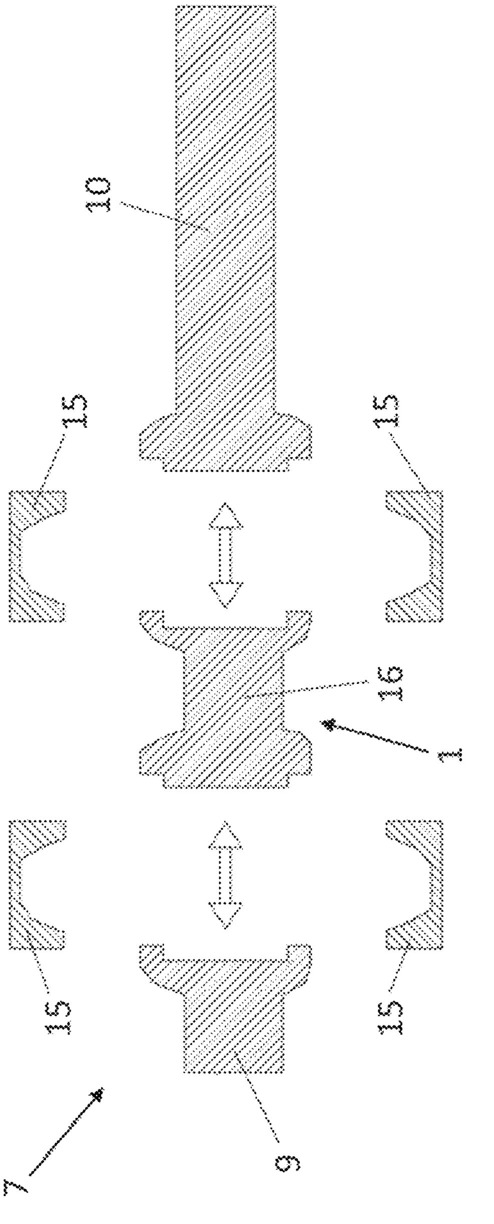

With respect to a change and/or cleaning of the filter element 3 of this embodiment example, reference is made to FIG. 2, wherein an exploded representation of the embodiment example of FIG. 1 is schematically represented.

It can thus be seen that, for the cleaning and/or changing of the filter element 3, the clamping rings 15 are detached and lifted off the front structural component 9 and the rear structural component 10.

The front structural component 9 and the filter component 16 are then lifted off the rear structural component 10 axially, whereby the filter component 16 is released from the rest of the injection cylinder 7.

In this disassembled state, the filter element 3 of the filter device 6 which is arranged in the filter component 16 can now be cleaned and/or changed.

Embodiments in which the whole filter component 16 is replaced in order to make a cleaned filter element 3 available as quickly as possible are also entirely conceivable.

The named component parts can then be reassembled in order to be able to use the plasticizing unit 6 again for plasticizing a material.

This process can be fully automated and, due to its simple disassembly and assembly and due to the pressure relief of the filter element 3, represents a very quick possibility for changing and/or cleaning the filter element 3.

This possibility and embodiment variant allow the shortest possible downtimes of the molding machine 2 and/or the plasticizing unit 6 for the cleaning and/or changing of the filter element 3 to be realized.

Figure 3:
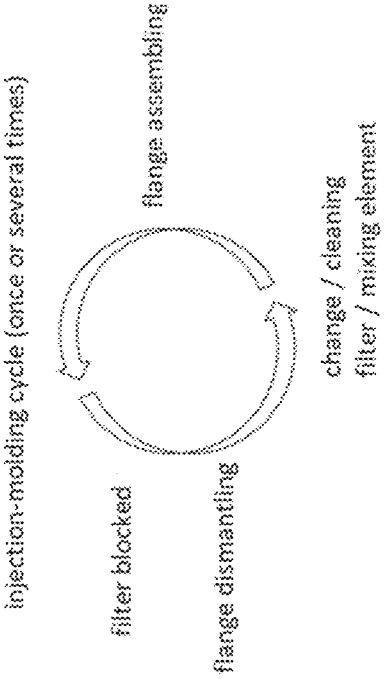
FIG. 3 a flow diagram of a filter change.

FIG. 3 shows a flow diagram of a possible use of a plasticizing unit 6 from FIG. 1 or 2 in an injection-molding machine, wherein one or more injection cycles can first be run through until the filter has a certain level of blockage.

In order to be able to remove this filter blockage, or coating or contamination, of the filter element 3, which impairs the plasticizing cycle, the flange dismantling is performed and a changing and/or cleaning of the filter element 3 is made possible.

After the filter element 3 has been cleaned and/or changed, the flange assembling can again take place in order to make the plasticizing unit 6 usable again, whereby the plasticizing unit 6 is in turn prepared in order to run through further injection-molding cycles.

FIGS. 4 to 7 show a further embodiment example of a plasticizing unit 6 with a filter device 1.

Figure 4:
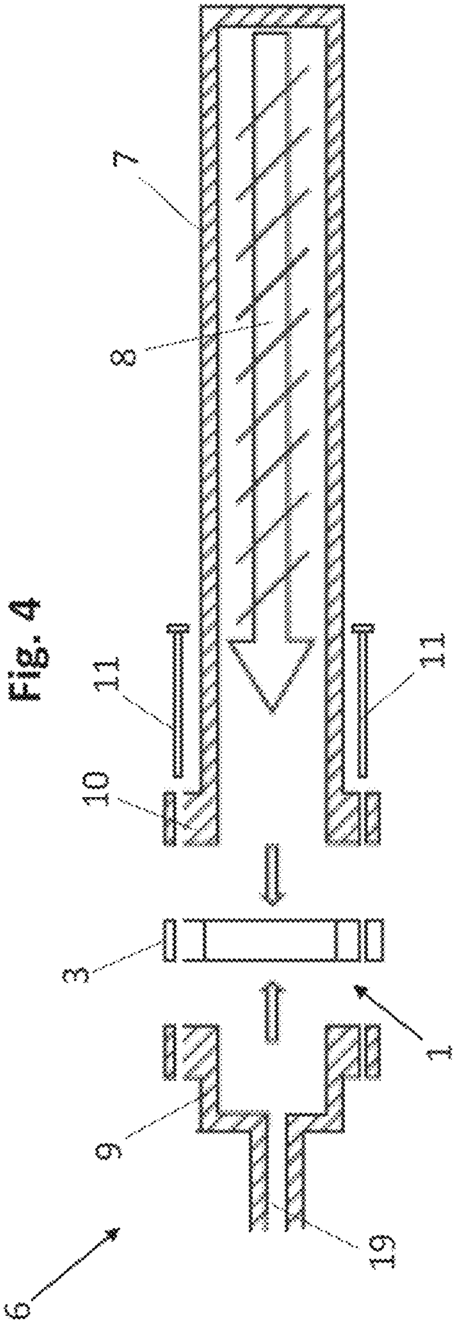
FIGS. 4-7 a second embodiment example of a plasticizing unit.

Here, for better clarification an exploded representation of this plasticizing unit 6 is represented in FIG. 4.

The represented plasticizing unit 6 of this embodiment example of FIG. 4 has an injection cylinder 7 which is formed by a front, nozzle-side structural component 9 and a rear structural component 10 in which a plasticizing screw 8 is arranged.

A filter element 3 of the filter device 1 is arranged between the front structural component 9 and the rear structural component 10 and is braced with the front structural component 9 and the rear structural component 10 via the tension means 11 or, in other words, is clamped between the front structural component 9 and the rear structural component 10.

The represented tension means 11 of this embodiment example can be formed as tension bolts or screws.

Figure 5:
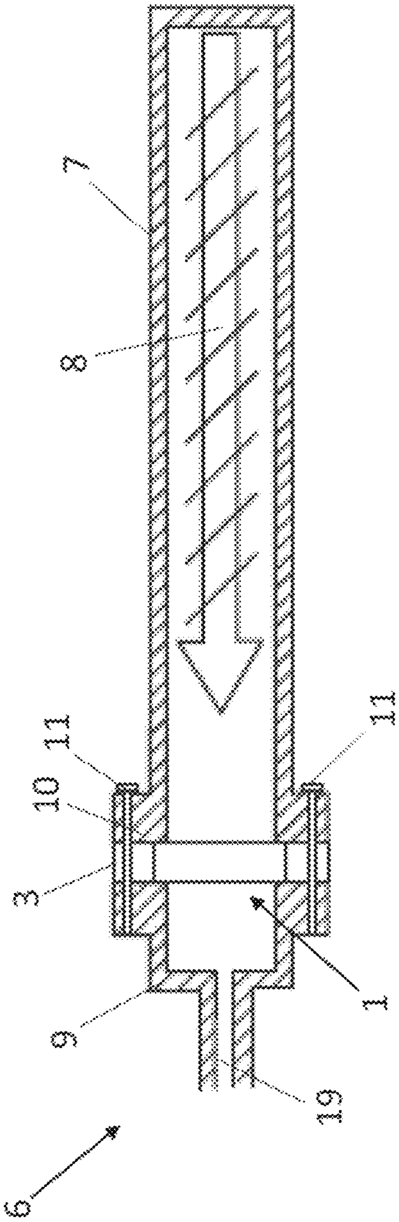

An assembled state of this embodiment example of FIG. 4 is represented in FIG. 5, wherein in the usual manner—as already described above—the plasticizing unit 6 can run through a plasticizing cycle, wherein material to be plasticized is plasticized by the plasticizing screw 8 and is filtered by the filter device 1, before the plasticized, purified material leaves the injection cylinder 7 via the injection nozzle opening 19.

Figure 6:
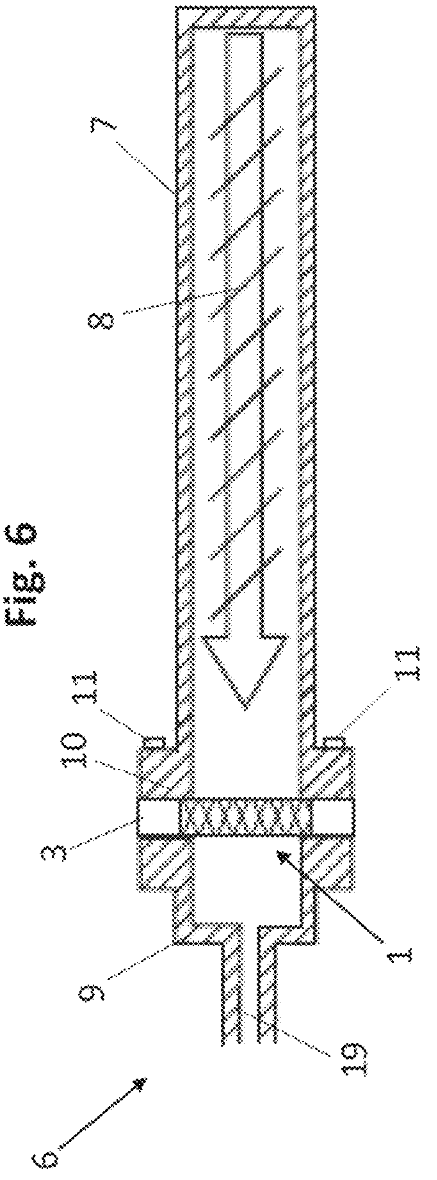

If the filter element 3 now has too great a coating and/or contamination after a number of plasticizing cycles (as indicated by FIG. 6 by the crossed-dashed filter element 3), the tension means 11 can be detached again in order to release the filter element 3 in order to change and/or clean it.

Figure 7:
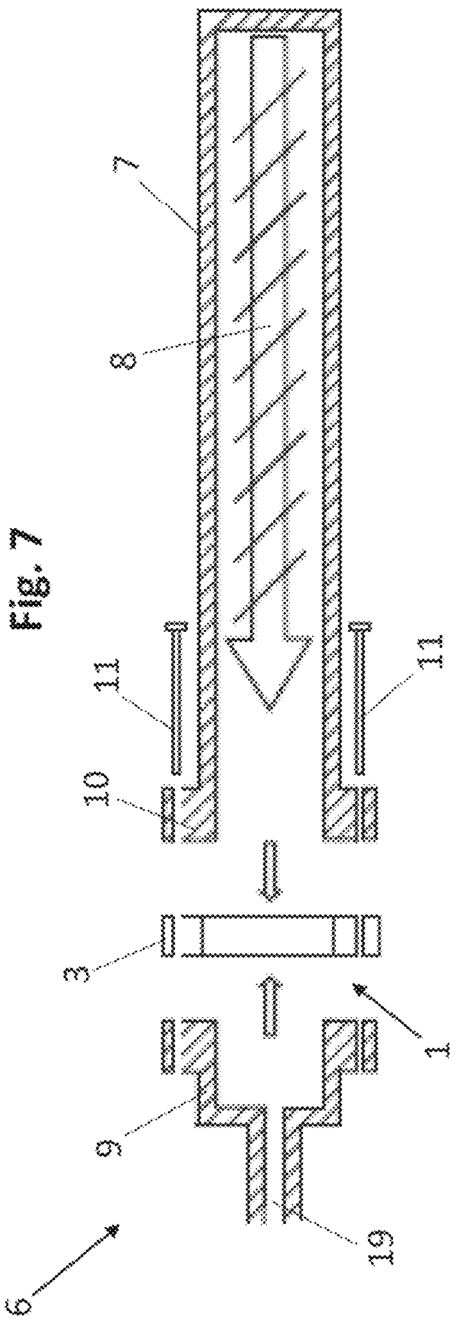

This position in which the filter element 3 is released from the front structural component 9 and the rear structural component 10 is in turn represented in FIG. 7.

After the filter element 3 has been cleaned and/or changed, it can again be braced between the front structural component 9 and the rear structural component 10 via the tension means 11 and the plasticizing cycles of the plasticizing unit 6 can be continued.

FIGS. 8 to 13 show a third embodiment example of a plasticizing unit 6.

Figure 8:
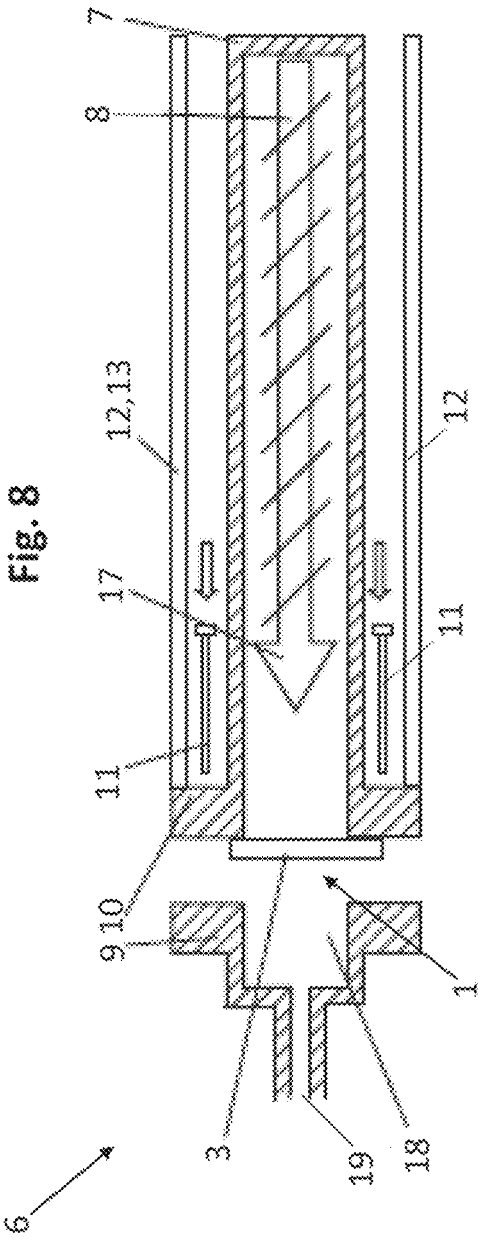
FIGS. 8-13 a third embodiment example of a plasticizing unit.

An exploded representation of this third embodiment example is represented again for clarity in FIG. 8, wherein, in comparison with the embodiment example of FIGS. 4 to 7, the third embodiment example of FIGS. 8 to 13 has an expansion element 12.

This expansion element 12 is formed via the two pressure or tension rods 13. The remaining features for the most part correspond to the embodiments already explained in relation to FIGS. 4 to 7.

Figure 9:
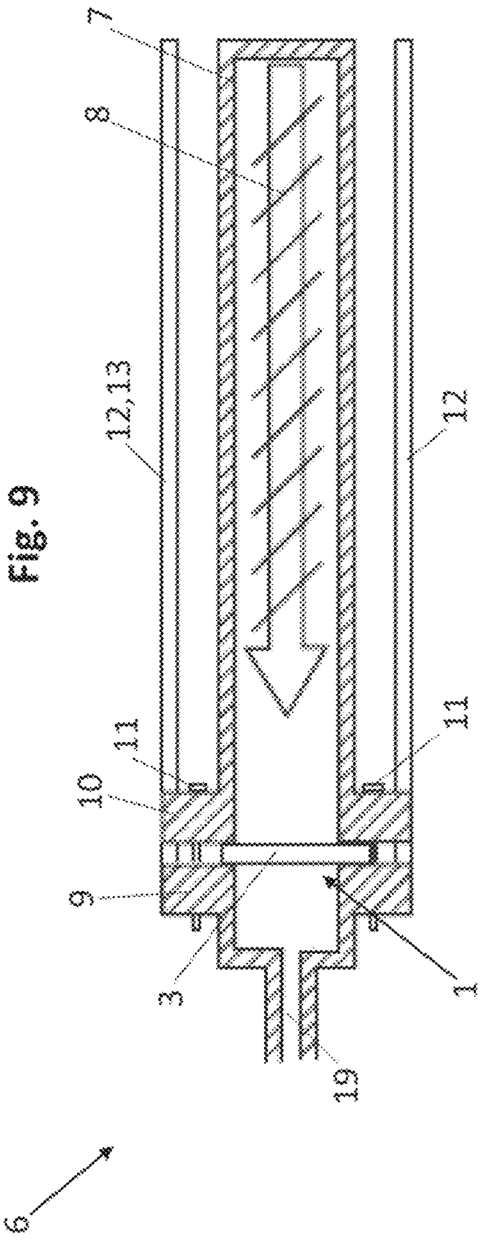

An assembly of the third embodiment example of FIGS. 8 to 13 is represented in FIG. 9, wherein it can be seen how the expansion element—more precisely: the pressure or tension rods 13—are mounted on the rear structural component 10 and pierce through it, wherein pressure or tension rods 13 contact the side of the front component 9 facing the rear structural component 10.

As already described in relation to the preceding embodiment examples, the third embodiment example of FIGS. 8 and 9 can also be added to the plasticizing cycle, wherein a material to be plasticized is plasticized via the plasticizing screw 8 and the plasticized material is then conveyed in the direction of the front component 9 via the filter element 3 of the filter device 1, until the plasticized material leaves the plasticizing unit 6 via the injection nozzle opening 19.

Figure 10:
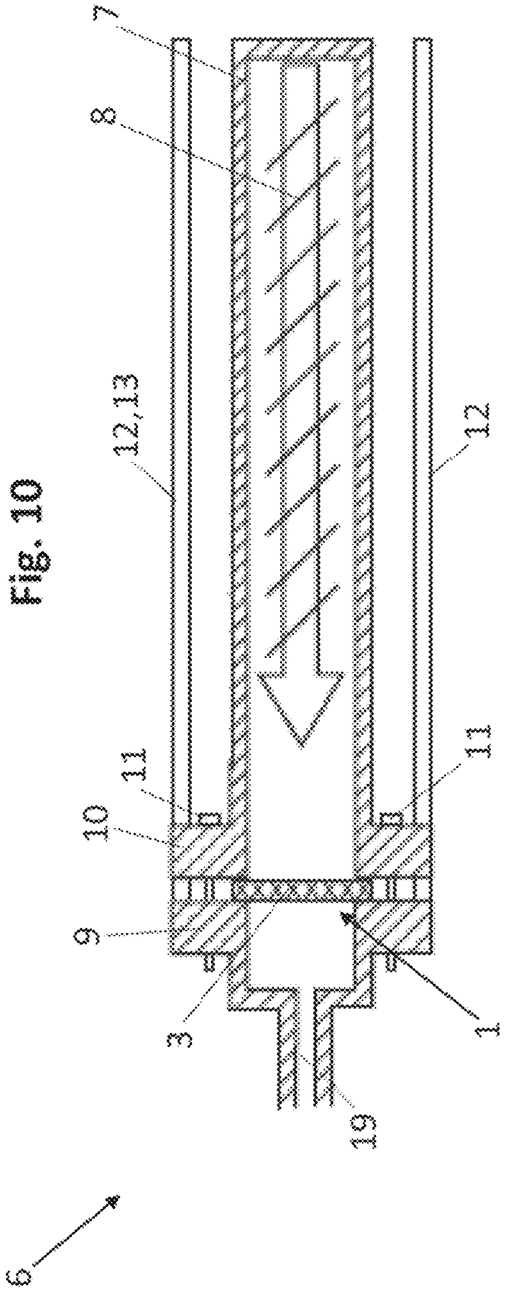

After a certain number of plasticizing cycles, the filter element 3 is again loaded with contaminants and coatings, which impair the plasticizing cycle, as is indicated by FIG. 10 and the crossed-dashed filter element 3.

In order now to be able to exchange or change the coated and/or contaminated filter element 3, in this embodiment example a spacing between the rear structural component 10 and the front structural component 9 can be increased with the aid of the expansion element 13 by exerting a pressure on the front structural component 9 via the pressure or tension rods 13.

Figure 11:
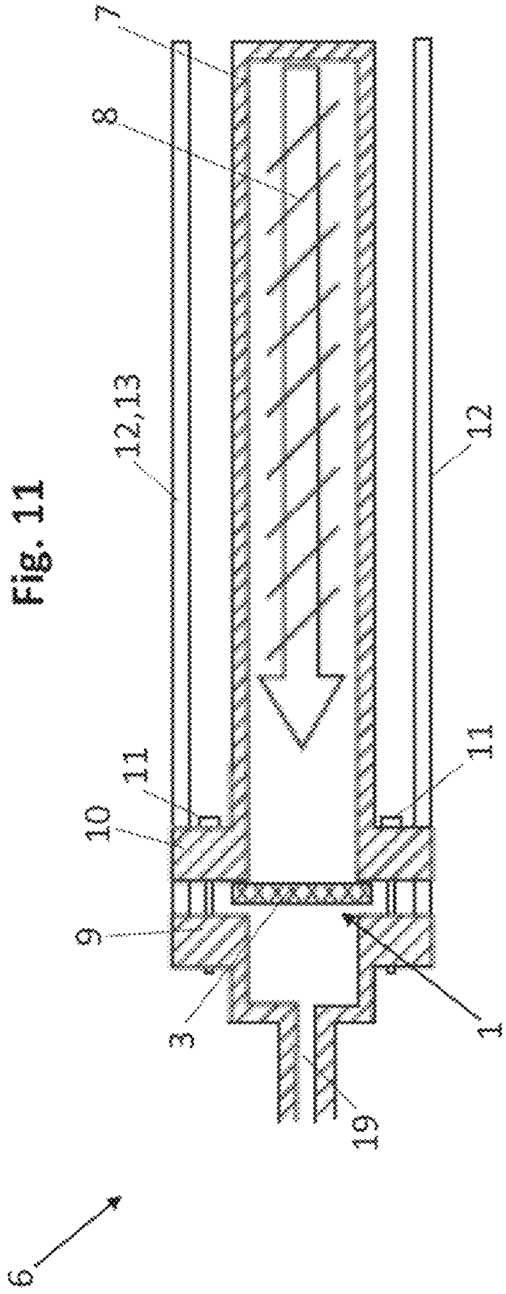

Due to the pressure exerted on the front structural component 9 and the fact that the rear structural component 10 is fixedly braced, the tension means 11 are—preferably primarily elastically—deformed (or more precisely: extended), whereby the spacing between the front structural component 9 and the rear structural component 10 increases (as can be seen through FIG. 11).

Due to the increase in the spacing between the front structural component 9 and the rear structural component 10, the filter element 3 of the filter device 1 is released, whereby the filter element 3 can be removed from the spacing between front structural component 9 and rear structural component 10 in order to clean and/or change the filter element 3.

Figure 12:
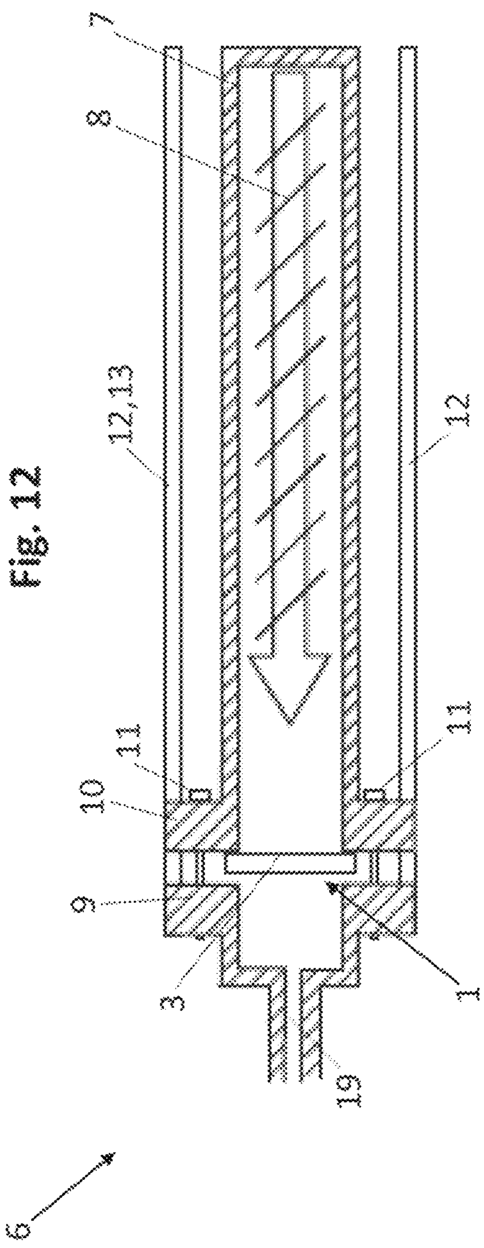

Then the cleaned filter element 3 or another filter element 3 can again be inserted into the gap between front structural component 9 and rear structural component 10, as can be seen through FIG. 12.

As soon as the cleaned or new filter element 3 is arranged in the gap between front structural component 9 and rear structural component 10, the pressure on the front structural component 9 can be dissipated via the pressure or tension rods 13, whereby the tension means 11 pull the front structural component 9 back against the rear structural component 10 and again brace the filter element 3 between the front structural component 9 and the rear structural component 10.

Figure 13:
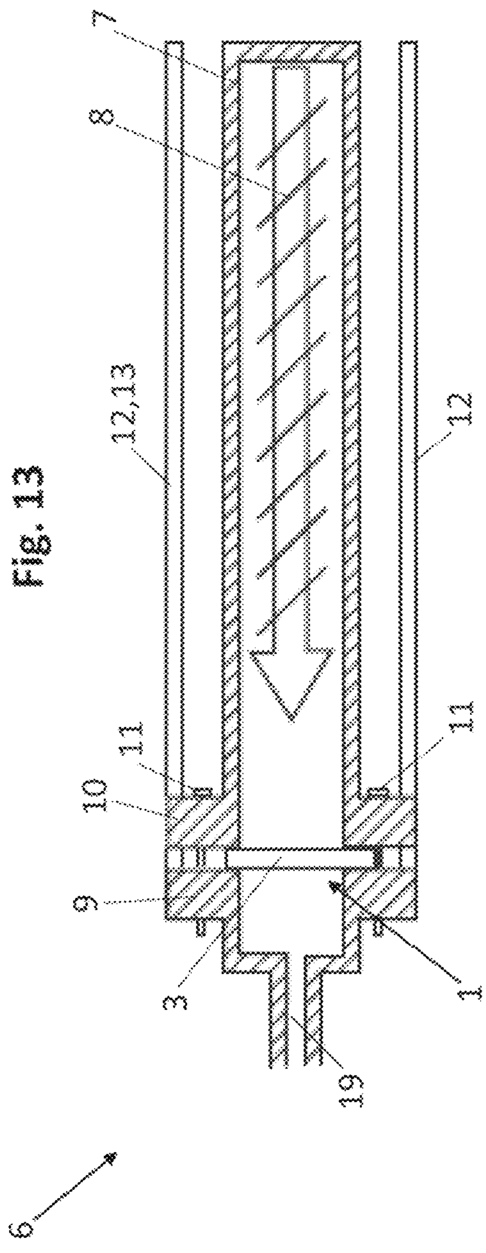

This state in which the filter element 3 is again braced between front structural component 9 and rear structural component 10 can be seen through FIG. 13, wherein in this state the plasticizing process can be started again and plasticized material can be filtered by the filter element 3.

Figures 14A, 14B, 14C:
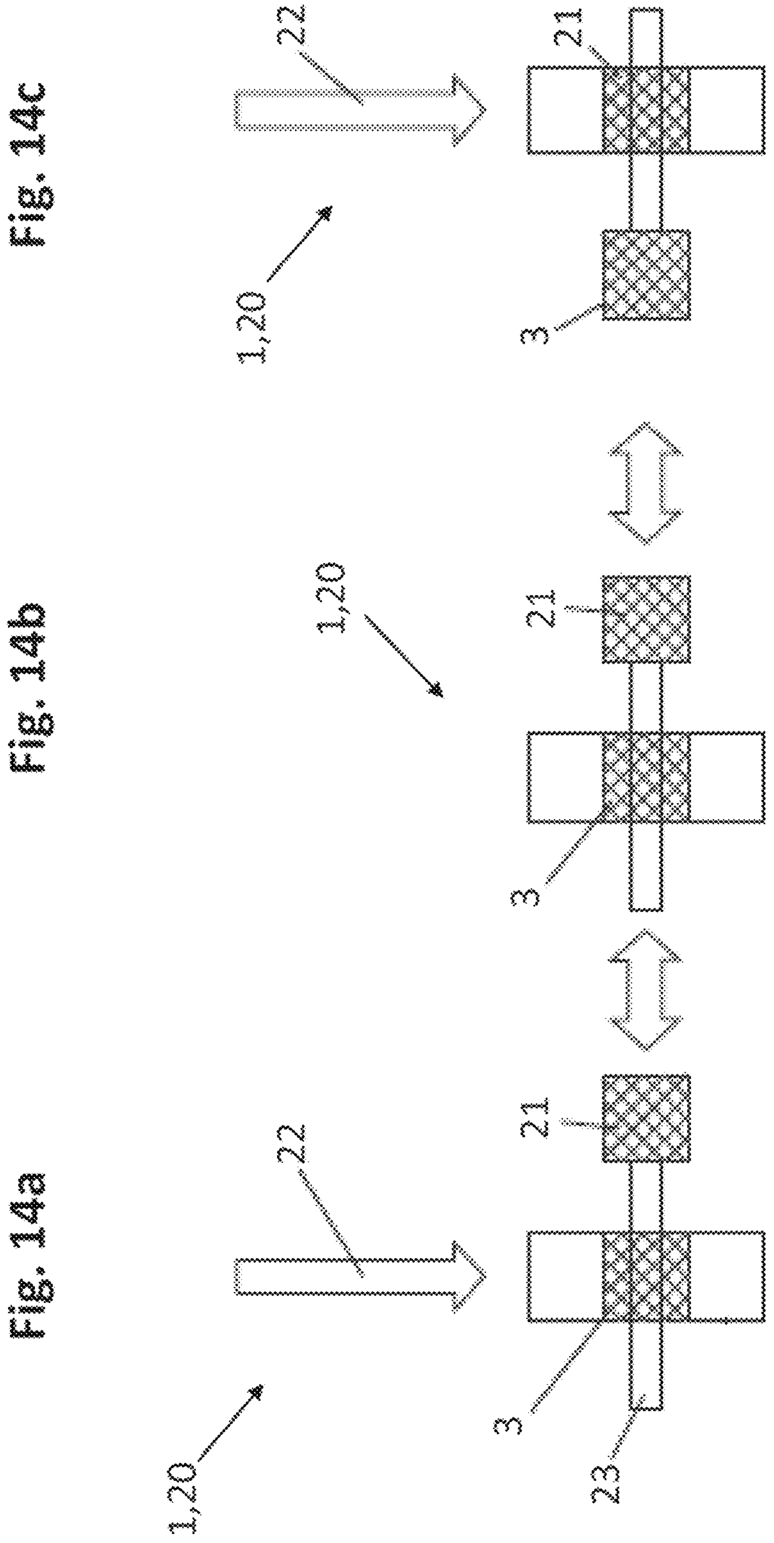
FIGS. 14*a-c* a filter change device of a filter device.

FIGS. 14*a* to 14*c* show, purely schematically, a filter device 1 which has a filter change device 20.

This filter change device 20 has a first filter element 3 and a (further) second filter element 21, which can be alternately added to a fluid stream 22 consisting of plasticized material in order to filter the plasticized material and/or to remove contaminants from it.

Correspondingly (see FIG. 14*a*), first of all a first filter element 3 is located in the fluid stream 22 of plasticized material for the filtration.

If the first filter element 3 now has too great a coating (contamination), a filter change can be carried out.

For the measurement of a coating, a pressure can for example be measured before and after the filter element 3, 21 and via the pressure difference between these two pressures—when the pressure difference becomes too great—the coating of the filter element 3, 21 can be referred to indirectly.

The cyclic filter change represents an alternative solution, wherein, according to empirical values, the filter elements 3, 21 are changed after a certain number of plasticizing cycles have been carried out.

During a filter change (such as is represented by FIG. 14*b*), the fluid stream 22 of plasticized material is briefly interrupted and the first filter element 3 is taken out of the injection cylinder 7 and replaced with the second filter element 21 via a change system 23.

After the change has been effected, the fluid stream 22 of plasticized material can be started again and supplied to the second filter element 21 (see FIG. 14*c*).

The filter element 3 can then be cleaned while the second filter element 21 is being used and exchanged into the fluid stream 22 of plasticized material again once a coating of the second filter element 21 becomes too great.

Figure 15:
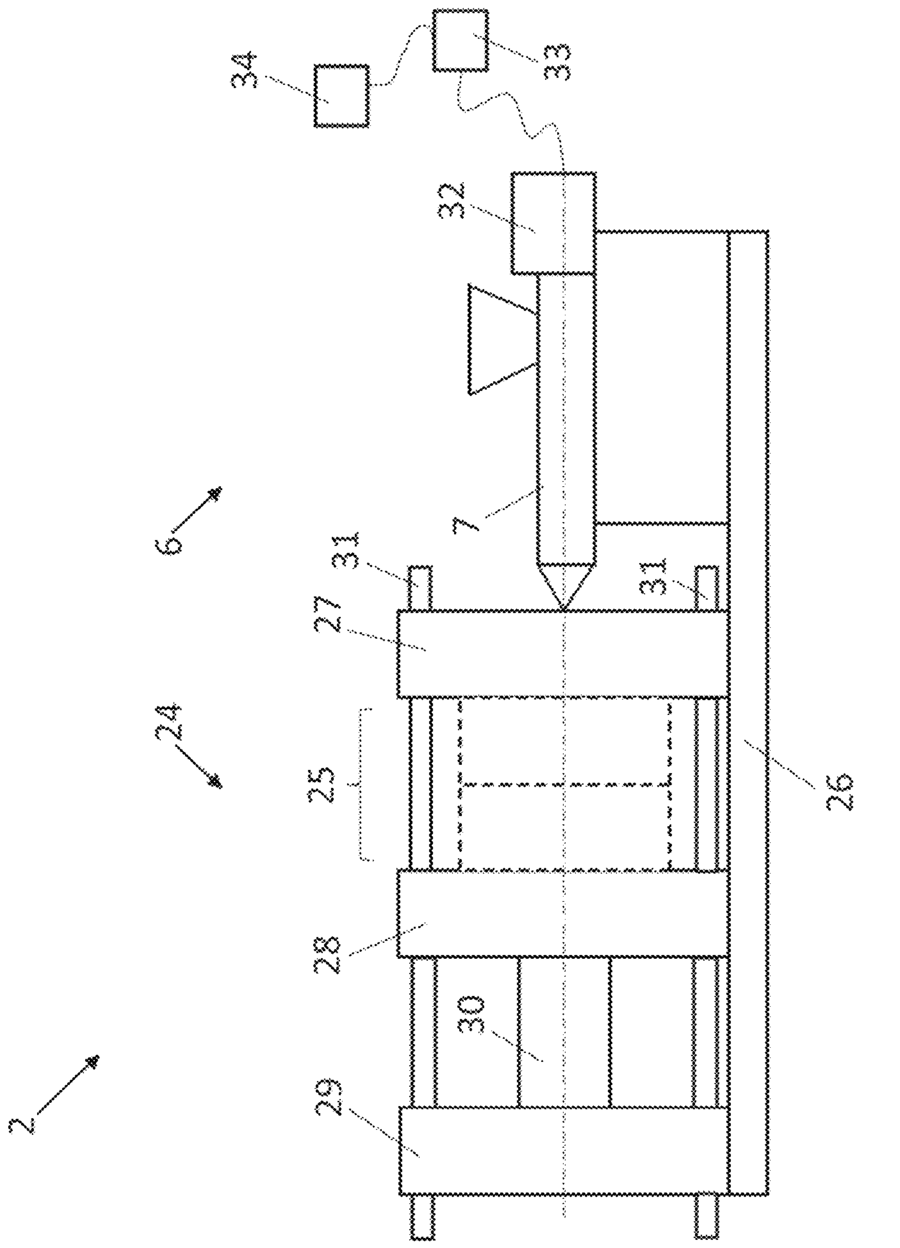
FIG. 15 a molding machine with a plasticizing unit.

The molding machine 2 represented by way of example in FIG. 15 is an injection-molding machine and has a plasticizing unit 6 and a clamping unit 24, which are arranged together on a machine frame 26. The machine frame 26 could alternatively also be formed multi-part.

The clamping unit 24 has a fixed platen 27, a movable platen 28 and an end plate 29.

The movable platen 28 is movable relative to the machine frame 26 via a symbolically represented knuckle joint mechanism 30.

Mold halves of a mold 25 can be clamped or fitted (represented dashed) on the fixed platen 27 and the movable platen 28.

The fixed platen 27, the movable platen 28 and the end plate 29 are mounted and guided relative to each other by the rails 31.

The mold 25 represented closed in FIG. 15 has at least one cavity. An injection channel, via which a plasticized material can be supplied to the plasticizing unit 6, leads to the cavity.

FIG. 15 shows a molding machine 2 with a plasticizing unit 6, wherein the plasticizing unit 6 shown in this embodiment example also serves as an injection unit and has a plasticizing screw 8 formed as an injection screw, which is also used for plasticizing a material to be plasticized.

The plasticizing unit 6 of this embodiment example has an injection cylinder 7 and a plasticizing screw 8 arranged in the injection cylinder 7. This plasticizing screw 8 is rotatable about an axis of rotation as well as movable axially along the axis of rotation in the conveying direction.

These movements are driven via a schematically represented drive unit 32. This drive unit 32 preferably comprises a rotary drive for the rotational movement and a linear drive for the axial injection movement.

The plasticizing unit 6 (and thus the injection unit) is in signaling connection with a control or regulating unit 33. Control commands are for example output to the plasticizing unit 6 and/or the drive unit 32 by the control or regulating unit 33.

The control or regulating unit 33 can be connected to an operating unit and/or a display device 34 or can be an integral constituent of such an operating unit.

LIST OF REFERENCE NUMBERS

1 filter device
2 molding machine
3 filter element
4 valve element
5 nonreturn valve
6 plasticizing unit
7 injection cylinder
8 plasticizing screw
9 front structural component
10 rear structural component
11 tension means
12 expansion element
13 pressure or tension rod
14 connection element
15 clamping ring
16 filter component
17 backflow barrier
18 space in front of the screw
19 injection nozzle opening
20 filter change device
21 second filter element
22 fluid stream
23 change system
24 clamping unit
25 mold
26 machine frame
27 fixed platen
28 movable platen
29 end plate
30 knuckle joint mechanism
31 rail
32 drive unit
33 control or regulating unit
34 display device

The invention claimed is:

1. A plasticizing unit for a molding machine, the plasticizing unit comprising: an injection barrel; and a plasticizing screw arranged in the injection barrel, wherein the injection barrel includes: a front nozzle-side structural component forming a front nozzle-side portion of the injection barrel; a rear structural component forming a rear portion of the injection barrel; and a filter device for filtering plasticized material arranged between the front nozzle-side structural component and the rear structural component, the filter device forming a part of the injection barrel.

2. The plasticizing unit according to claim 1, wherein the front nozzle-side structural component and the rear structural component are braced by means of at least one tension means which is arranged alongside the injection barrel and transverse to a connection point between the front nozzle-side structural component and the rear structural component.

3. The plasticizing unit according to claim 2, wherein the filter device is braced directly with the front nozzle-side structural component and the rear structural component by means of the at least one tension means at the connection point between the front nozzle-side structural component and the rear structural component.

4. A plasticizing unit for a molding machine, the plasticizing unit comprising an injection cylinder, wherein the injection cylinder includes:

a front nozzle-side structural component;

a rear structural component; and a filter device for filtering plasticized material arranged between the front nozzle-side structural component and the rear structural component, wherein the front nozzle-side structural component and the rear structural component are braced by means of at least one tension means which is arranged alongside the injection cylinder and transverse to a connection point between the front nozzle-side structural component and the rear structural component, and wherein the plasticizing unit further comprises at least one expansion element which is formed to establish or increase a spacing between the front nozzle-side structural component and the rear structural component, wherein the at least one tension means is extended under deformation.

5. The plasticizing unit according to claim 4, wherein the at least one expansion element has a drive unit.

6. The plasticizing unit according to claim 4, wherein the at least one expansion element has at least one pressure or tension rod, which is formed to establish or increase the spacing between the front nozzle-side structural component and the rear structural component by exerting a pressure or a tension on the front nozzle-side structural component or the rear structural component.

7. The plasticizing unit according to claim 1, wherein the front nozzle-side structural component or the rear structural component has a connection element.

8. The plasticizing unit according to claim 1, wherein the front nozzle-side structural component and the rear structural component are connected by means of at least one clamping ring.

9. The plasticizing unit according to claim 1, wherein the filter device is arranged in a filter component of the injection barrel, the filter component being a component of the injection barrel that is separate from the front nozzle-side structural component and the rear structural component and together with the front nozzle-side structural component and the rear structural component forms the injection barrel.

10. The plasticizing unit according to claim 1, further comprising a separate clamping component, wherein the front nozzle-side structural component is braced with the separate clamping component and the separate structural component is braced with the rear structural component.

11. The plasticizing unit according to claim 10, wherein a bracing of the front nozzle-side structural component with the rear structural component or the filter component or the separate clamping component has at least one clamping ring or a partially radial force component.

12. A molding machine comprising a plasticizing unit according to claim 1.

13. The plasticizing unit according to claim 1, wherein the filter device includes at least one filter element for filtering the plasticized material, wherein, in a fluidically parallel arrangement relative to the at least one filter element, at least one valve element is provided, the at least one valve element being configured to prevent the plasticized material from flowing through the at least one valve element during an injection process in a closed position, and allow the plasticized material to flow through the at least one valve element in a open position so as to relieve a pressure on the at least one filter element after the injection process.

14. The plasticizing unit according to claim 13, wherein the at least one valve element is formed as a check valve.

15. The plasticizing unit according to claim 13, wherein the at least one filter element is arranged centrally in a flow direction of the plasticized material.

16. The plasticizing unit according to claim 13, wherein the at least one filter element at least partially surrounds the at least one valve element.

17. The plasticizing unit according to claim 13, wherein the plasticizing screw is rotationally and linearly movable in the injection barrel.

18. The plasticizing unit according to claim 17, wherein the filter device is downstream of the plasticizing screw and is formed to filter a material plasticized by the plasticizing screw.

19. The plasticizing unit according to claim 4, wherein the at least one tension means is extended under at least partial elastic deformation.

20. The plasticizing unit according to claim 7, wherein the connection element is a flange point or a clamping flange.

21. The plasticizing unit according to claim 16, wherein the at least one filter element at least partially surrounds the at least one valve element in a plane transverse to a flow direction of the plasticized material.

* * * * *